United States Patent [19]

Smith

[11] 4,205,447

[45] Jun. 3, 1980

[54] PIPE MEASURING DEVICE

[75] Inventor: Mervel J. Smith, Franklin, La.

[73] Assignee: Exxon Production Research Company, Houston, Tex.

[21] Appl. No.: 5,258

[22] Filed: Jan. 22, 1979

[51] Int. Cl.² ............................................. G01B 3/12
[52] U.S. Cl. .................................... 33/134 R; 33/129
[58] Field of Search ................. 33/132 R, 132 A, 133, 33/134 R, 136, 129; 73/151

[56] References Cited

U.S. PATENT DOCUMENTS

| | | | |
|---|---|---|---|
| 1,417,021 | 5/1922 | Berel | 33/134 R |
| 1,768,809 | 7/1930 | Orstrand | 33/134 R |
| 2,629,257 | 2/1953 | Link | 33/134 R X |
| 3,318,005 | 5/1967 | Petersen | 33/134 R |
| 3,828,437 | 8/1974 | Heselwood | 33/134 R |
| 4,117,600 | 10/1978 | Guignard et al. | 33/133 |

*Primary Examiner*—Richard E. Aegerter
*Attorney, Agent, or Firm*—John S. Schneider

[57] ABSTRACT

A device for measuring the length of a string of well pipe as it is run into or pulled from a well bore and for counting the number of pipe collars connecting the pipe sections together includes a support frame having an opening therethrough for accommodating a pipe string. A laterally moveable carriage is mounted on the frame. A measuring wheel and a roller are connected to the carriage. Tension springs connect the roller to the carriage for urging the roller and measuring wheel into engagement with the well pipe and pipe collars. An actuator is connected to the roller for registering lateral movement of the roller. Recoil springs connect the carriage and the frame for absorbing the force of the shock caused by contact of the measuring wheel with the pipe collars and means are connected to the measuring wheel to convert rotational travel of the wheel to the length of the pipe string measured.

2 Claims, No Drawings

FIG. 1.
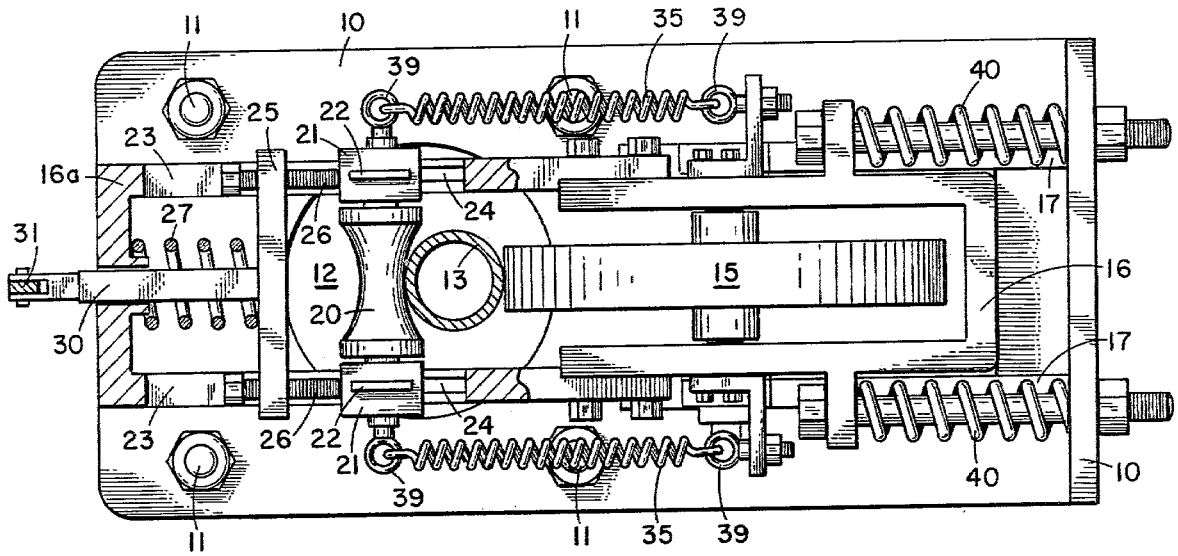
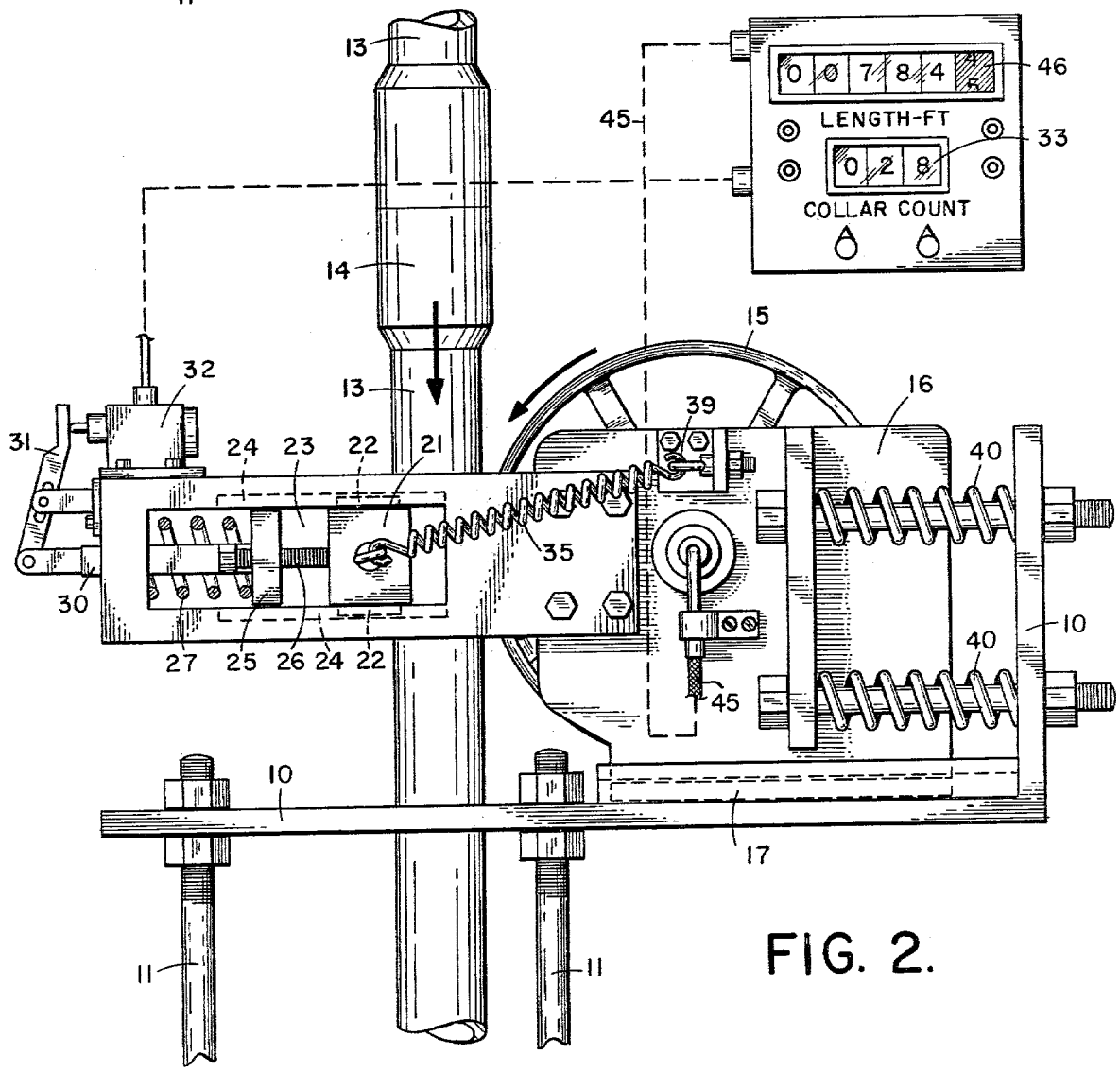
FIG. 2.

PIPE MEASURING DEVICE

BACKGROUND OF THE INVENTION

This invention relates to measuring well pipe while running such pipe into or pulling such pipe from wells. In oil field workover operations the measurement of well pipe run into and pulled from oil, gas or service wells is required. Well pipe normally is delivered in 30-40 foot joints or sections. Those sections are connected together by pipe collars as they are run into the well. It has been common practice to measure the pipe in either a horizontal or vertical position by hand using a tape measure and then record the length of each joint in a tally book. This practice, of course, is time consuming and tedious and its accuracy is highly dependent on weather conditions and the competency of personnel making the measurements. Automatic measuring devices have also been suggested for measuring the length of well pipe being run into or pulled from a well bore. However, none of those devices includes an automatic joint counter for determining the number of joints in the borehole at any time. Further, the present device furnishes remote readouts of the length of pipe measured and the number of collars counted for the driller or operator.

SUMMARY OF THE INVENTION

The device for measuring the length of tubular members (pipe) and the counting collars which connect the members together comprises a support frame having an opening therethrough for accomodating the tubular members; a carriage slideably mounted on said support frame; a rotatable measuring wheel mounted on said carriage and moveable therewith; a rotatable and laterally movable (centering) roller arranged on said carriage and spaced from said measuring wheel; resilient means connecting said roller and said carriage for urging said roller and said measuring wheel into engagement with said tubular members; an actuator for registering lateral movement of said roller; collar recoil springs connecting said carriage and said frame; and means connected to said measuring wheel to convert rotation of said wheel to measured lengths of said tubular members traversed by said wheel.

DESCRIPTION OF THE DRAWINGS

FIG. 1 is a plan view of the measuring and counting device of the invention; and FIG. 2 is a side elevation of the device shown in FIG. 1 connected to a remote readout apparatus.

DESCRIPTION OF THE PREFERRED EMBODIMENT

The measuring and counting device of the invention illustrated in FIGS. 1 and 2 includes a support frame 10 mounted on support rods 11 and having an opening 12 therethrough. A tubular member or pipe section 13 extends through opening 12. A pipe collar or coupling 14, larger in diameter than the diameter of the pipe sections, connects the sections of the pipe together. A measuring wheel 15 is supported in a laterally moveable carriage 16 which is slideable in guide and retainer tracks 17 provided on frame 10. A centering idler or roller 20 having a concave curvature to conform better to the curvature of pipe 13 and collars 14 is spaced from measuring wheel 15 and mounted for rotation in bearing blocks 21 which contain retainer lugs 22. Elongated openings 23 are formed in opposite walls of an extension 16a of carriage 16. Retainer slots 24 are provided in the upper and lower walls of extension 16a. Those slots engage retainer lugs 22. A plate member 25, slidably arranged in openings 23, contains threaded adjusting bolts 26 which abut against bearing blocks 21. A compression spring 27 urges plate 25, adjusting bolts 26, bearing blocks 21 and roller 20 in the direction of pipe 13. A relay actuator rod 30 extends through an opening in the end of extension 16a and connects plate 25 to a relay actuator linkage 31 which, in turn, engages a collar counter relay mechanism 32. A remote display collar counter may be connected to relay mechanism 32.

A pair of tension springs 35 connect bearing blocks 21 to eyebolts 39 connected to carriage 16. Two recoil springs 40 connect carriage 16 to frame 10 to absorb shock forces which result when collar 14 passes between wheel 15 and roller 20.

As collar 14 passes roller 20 it moves the roller laterally to the left (in FIGS. 1 and 2) which in turn moves actuator rod 30 to the left to actuate linkage 31 and generate a signal at the mechanical collar counter 32 which is registered at the remote display collar counter 33. Tension springs 35 maintain roller 20 in contact with pipe 13 and, also, keep measuring wheel 15 in contact with the pipe.

The adjusting bolts 26 abut against bearing blocks 21 and allow adjustment for larger or smaller pipe diameters without affecting the travel or movement of actuator rod 30.

The shaft of measuring wheel 15 is mounted in bearings in carriage 16. A flexible cable 45 connects the axle or shaft of measuring wheel 15 to a remote display readout 46. The shaft drives the cable to transmit the distance traversed by wheel 15 to readout 46. The distance measured may be shown in feet or any other desired measure of length. The readout is reversible in order to be able to subtract when removing pipe from the well and add when running pipe into the well.

The measuring and counting device is mounted preferably below the rig floor directly beneath the rotary and may be attached to the top of the blowout preventer (BOP) stack by mounting rods 11.

The foregoing description of the invention is illustrative and explanatory thereof. Various changes in the size and shape as well as in the details of the illustrated construction may be made without departing from the spirit of the invention.

What is claimed is:

1. A device for measuring the length of a string of tubular members connected one to another by a collar and for counting the collars, each collar having a larger diameter than the diameters of the tubular members to which it is connected, comprising:

a support frame having an opening therethrough to accommodate said tubular members;

a carriage slideably mounted on said frame;

a rotatable measuring wheel mounted on said carriage on one side of said opening and moveable with said carriage;

a rotatable and laterally moveable centering roller having a concave surface and mounted on said carriage on the side of said opening opposite to said one side and spaced from said wheel; tension springs connecting said roller and said carriage for urging said roller and said measuring wheel into engagement with said tubular members and said collars;

recoil springs connecting said carriage to said frame for absorbing forces generated when said measuring wheel engages said collars;

an actuator for registering lateral movement of said roller for measuring the number of collars; and means connected to said measuring wheel to measure the distance travelled by said wheel.

2. A device as recited in claim 1 including means to adjust for larger and smaller tubular member diameters.

* * * * *